US010443320B2

(12) United States Patent
Kirkhope

(10) Patent No.: US 10,443,320 B2
(45) Date of Patent: Oct. 15, 2019

(54) ARTICULATING ASSEMBLY FOR TRANSMITTING ROTATION BETWEEN ANGULARLY OFFSET MEMBERS

(71) Applicant: Halliburton Energy Services, Inc., Houston, TX (US)

(72) Inventor: Kennedy John Kirkhope, Leduc (CA)

(73) Assignee: Halliburton Energy Services, Inc., Houston, TX (US)

( * ) Notice: Subject to any disclaimer, the term of this patent is extended or adjusted under 35 U.S.C. 154(b) by 23 days.

(21) Appl. No.: 15/558,280

(22) PCT Filed: Apr. 17, 2015

(86) PCT No.: PCT/CA2015/000257
§ 371 (c)(1),
(2) Date: Sep. 14, 2017

(87) PCT Pub. No.: WO2016/165002
PCT Pub. Date: Oct. 20, 2016

(65) Prior Publication Data
US 2018/0058153 A1 Mar. 1, 2018

(51) Int. Cl.
*E21B 17/03* (2006.01)
*E21B 17/05* (2006.01)
*E21B 4/02* (2006.01)
*F16D 3/20* (2006.01)
*E21B 17/02* (2006.01)
*E21B 4/00* (2006.01)
*F16D 3/205* (2006.01)

(52) U.S. Cl.
CPC .............. *E21B 17/05* (2013.01); *E21B 4/006* (2013.01); *E21B 4/02* (2013.01); *E21B 17/02* (2013.01); *E21B 17/03* (2013.01); *F16D 3/20* (2013.01); *F16D 3/2052* (2013.01)

(58) Field of Classification Search
CPC .......... E21B 17/05; E21B 4/006; E21B 17/02; E21B 4/02
USPC ......................................... 464/151, 155, 156
See application file for complete search history.

(56) References Cited

U.S. PATENT DOCUMENTS

| 3,345,084 | A | 10/1967 | Hanes et al. |
| 3,414,034 | A | 12/1968 | Imse |

(Continued)

FOREIGN PATENT DOCUMENTS

| CA | 2269145 A1 | 10/2000 |
| GB | 1291708 | 10/1972 |

(Continued)

*Primary Examiner* — David J Bagnell
*Assistant Examiner* — Brandon M Duck
(74) *Attorney, Agent, or Firm* — Terrence N. Kuharchuk; Parlee McLaws LLP; Craig W. Roddy

(57) ABSTRACT

An articulating assembly, including a first member having a first end, a second member, and a first coupling shaft engaged with the first end of the first member and with the second member, wherein the first coupling shaft has a first coupling shaft axis, the first coupling shaft is rotatable relative to the second member about the first coupling shaft axis, wherein the first member is rotatable relative to the first coupling shaft about a swivel axis, and wherein the swivel axis is perpendicular to the first coupling shaft axis, thereby providing an articulating coupling between the first end of the first member and the second member. The articulating assembly may further include an articulating coupling between a second end of the first member and a third member.

20 Claims, 5 Drawing Sheets

(56) References Cited

U.S. PATENT DOCUMENTS

| | | |
|---|---|---|
| 4,607,865 A | 8/1986 | Hughes |
| 4,708,513 A | 11/1987 | Roche et al. |
| 4,844,510 A | 7/1989 | Theiss et al. |
| 4,900,066 A | 2/1990 | Brammer et al. |
| 4,919,459 A | 4/1990 | Miller |
| 5,129,688 A | 7/1992 | McGarvey |
| 5,447,472 A | 9/1995 | Ide |
| 5,735,657 A | 4/1998 | Slepekis |
| 5,860,864 A | 1/1999 | Vukovic |
| 6,305,723 B1 | 10/2001 | Schutz et al. |
| 6,460,901 B2 | 10/2002 | Rochelle |
| 6,832,790 B2 | 12/2004 | Olson |
| 7,568,737 B2 | 8/2009 | Wells et al. |
| 7,984,932 B2 | 7/2011 | McGuire |
| 8,672,366 B2 | 3/2014 | Mogedal et al. |
| 2009/0275415 A1 | 11/2009 | Prill et al. |
| 2010/0329776 A1 | 12/2010 | Durling |
| 2014/0224545 A1 | 8/2014 | Nicol-Seto |
| 2015/0259996 A1 | 9/2015 | Tao et al. |

FOREIGN PATENT DOCUMENTS

| | | |
|---|---|---|
| RU | 2488682 C1 | 7/2013 |
| WO | 2014022765 A1 | 2/2014 |

ARTICULATING ASSEMBLY FOR TRANSMITTING ROTATION BETWEEN ANGULARLY OFFSET MEMBERS

TECHNICAL FIELD

An articulating assembly with one or more articulating couplings for transmitting rotation between angularly offset members.

BACKGROUND OF THE INVENTION

An articulating coupling such as a universal coupling may be used to enable two members coupled at an angular offset relative to each other to rotate about different axes. A pair of articulating couplings may be used in some configurations, such as in a constant velocity joint, to enable two or more members coupled at an angular offset relative to each other to rotate at a relatively constant speed.

BRIEF DESCRIPTION OF DRAWINGS

Embodiments of the invention will now be described with reference to the accompanying drawings, in which.

DETAILED DESCRIPTION

Figure 1:
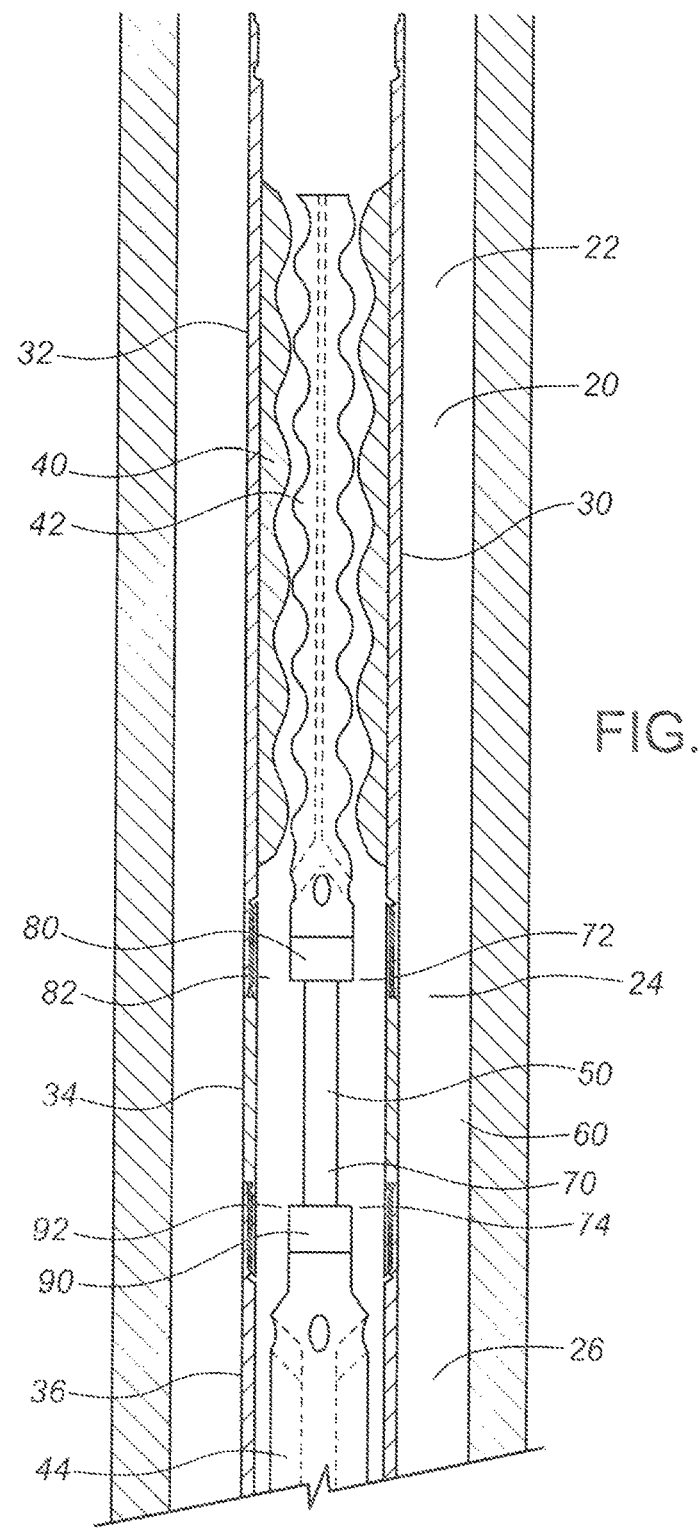
FIG. 1 is a schematic longitudinal partial section view of components of an exemplary drilling motor for use in drilling a borehole, including a transmission section and an articulating assembly, shown within a borehole.
Figure 2:
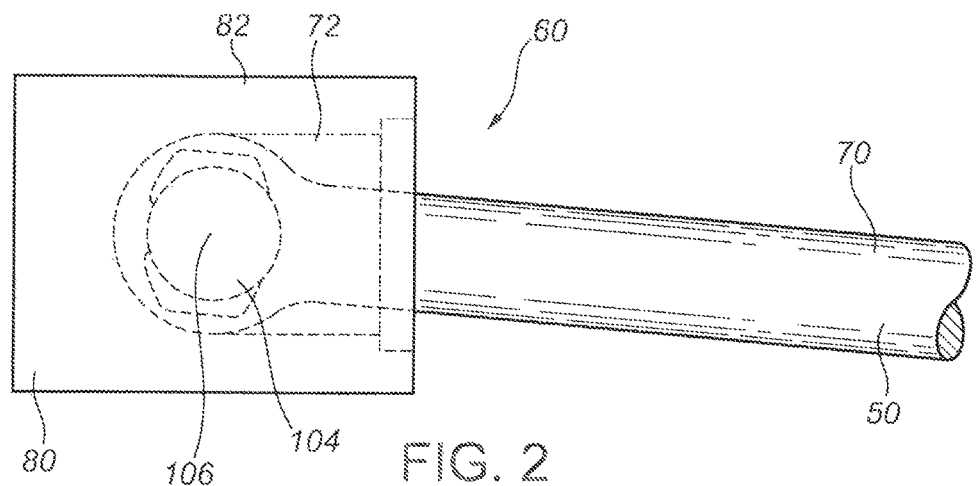
FIG. 2 is a side partial cutaway view of an embodiment of components of the articulating assembly depicted in FIG. 1, including a first articulating coupling.
Figure 3:
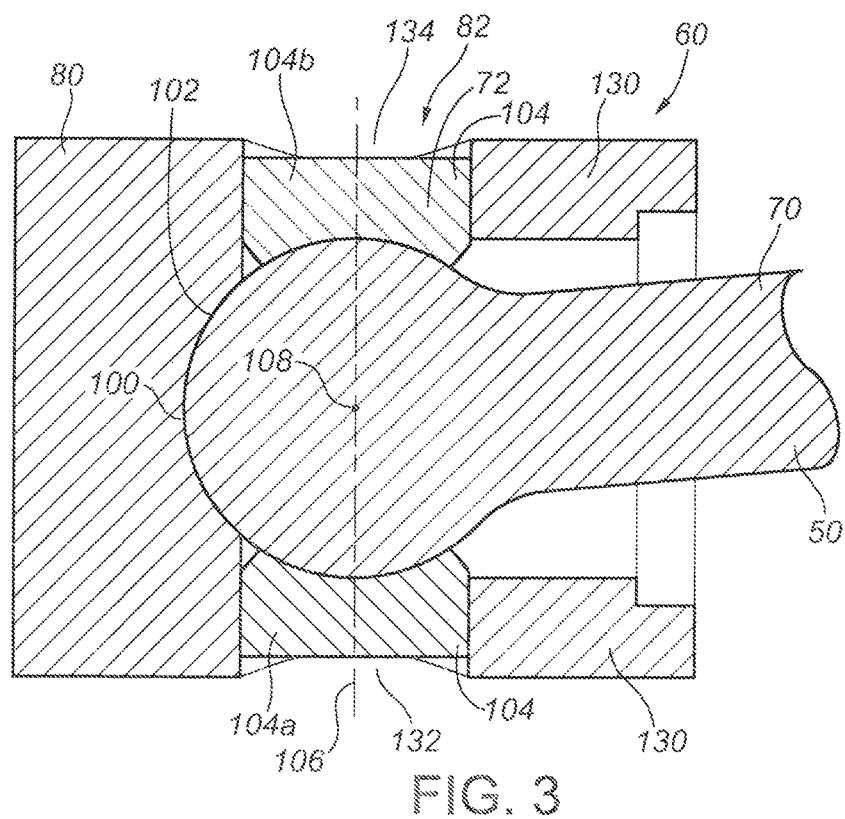
FIG. 3 is a plan partial section view of an embodiment of components of the articulating assembly depicted in FIG. 1, including a first articulating coupling.
Figure 4:
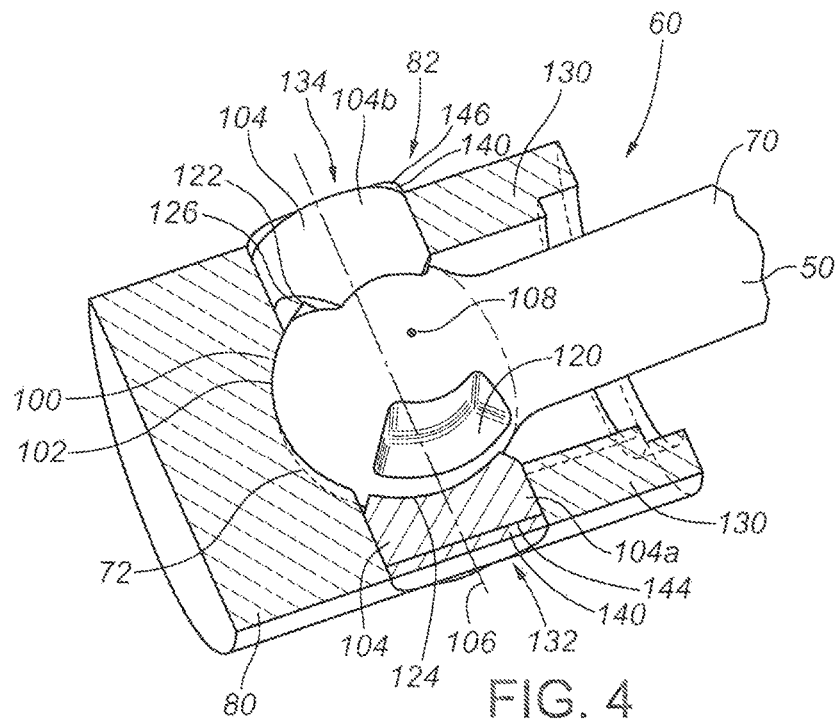
FIG. 4 is a pictorial partial cutaway view of an embodiment of components of the articulating assembly depicted in FIG. 1, including a first articulating coupling.

References in this document to orientations, to operating parameters, to ranges, to lower limits of ranges, and to upper limits of ranges are not intended to provide strict boundaries for the scope of the invention, but should be construed to mean "approximately" or "about" or "substantially", within the scope of the teachings of this document, unless expressly stated otherwise.

The present disclosure is directed at an articulating assembly between two or more members, comprising at least one articulating coupling.

As used herein, "articulating coupling" means a coupling which enables relative articulation between two members about two substantially perpendicular axes and/or in at least two substantially perpendicular planes.

In some embodiments, the members may be elongate members, including as non-limiting examples, columns, beams, or shafts. In some embodiments, the members may be stationary structural members. In some embodiments, the members may be movable members, including as non-limiting examples, rotatable shafts or members.

In some embodiments, one or more of the members may be shafts. In some embodiments, one or more of the members may be adapters.

In some embodiments, a plurality of shafts may be configured as members to be coupled together in the articulating assembly. In some embodiments, a plurality of adapters may be configured as members to be coupled together in the articulating assembly. In some embodiments, one or more shafts and one or more adapters may be configured as members to be coupled together in the articulating assembly. In some embodiments, an adapter may be configured to be connected directly or indirectly with or integrated with a shaft in order to provide a member comprising a shaft and an adapter.

The articulating assembly may be used in any structure, device or apparatus in which it is necessary or desirable to couple two or more members with articulating couplings.

In some embodiments, the articulating assembly may be used in an apparatus which is configured to be inserted and/or contained and/or used within a borehole. In some embodiments, the articulating assembly may be used in an apparatus for use in drilling a borehole. In some embodiments, the articulating assembly may be comprised of components of a powertrain.

As a non-limiting example, in some embodiments, the structure, device or apparatus may be a drilling motor. In some embodiments, the articulating assembly may be used to couple components of a powertrain of a drilling motor.

In some embodiments, one of the members may be a transmission shaft or a component of a transmission shaft in a drilling motor. In some embodiments, one of the members may be a rotor or a component of a rotor in a drilling motor. In some embodiments, one of the members may be a driveshaft or a component of a driveshaft in a drilling motor.

In some embodiments, one or more of the members may be an adapter which is configured to be connected directly or indirectly with or integrated with a transmission shaft, a rotor or a driveshaft in the drilling motor. In some embodiments, an adapter may be considered to be a component of a transmission shaft, a rotor and/or a driveshaft in the drilling motor so that a member comprises a shaft or rotor and an adapter connected with or integrated with the shaft or rotor.

In some embodiments, the articulating assembly may comprise a first member and a second member. The first member and the second member may comprise any suitable type of member.

The first member may have a first end and a second end. As used herein, the "first end" and the "second end" of the first member are not limited to the peripheral end surfaces of the first member, but also include any structures or features of the first member which may be adjacent to a particular peripheral end surface and which may be associated with a particular end of the first member.

The first end of the first member may comprise a first thrust bearing surface. The second member may comprise a second thrust bearing surface. In some embodiments, the first thrust bearing surface may be configured to engage with the second thrust bearing surface in order to transmit axial forces between the first member and the second member.

In some embodiments, one of the first end of the first member and the second member may comprise a pin or male component, and the other of the first end of the first member and the second member may comprise a socket or female component. In such embodiments, the first end of the first member may be received within the second member or the second member may be received within the first end of the first member. In some particular embodiments, the first end of the first member may be received within the second member.

In some embodiments, the articulating assembly may provide an articulating coupling between the first member and the second member.

In some embodiments, the articulating assembly may comprise a first coupling shaft which is engaged with the first end of the first member and with the second member. The first coupling shaft may comprise any suitable structure, device or apparatus or any suitable combination of structures, devices or apparatus.

The first coupling shaft may have a first coupling shaft axis. In some embodiments, the first coupling shaft may be rotatable relative to the second member about the first coupling shaft axis, the first member may be rotatable relative to the first coupling shaft about a swivel axis, and the swivel axis may be substantially perpendicular to the first coupling shaft axis. As a result, in such embodiments, the first member and the second member may be articulable relative to each other about two substantially perpendicular axes and/or in at least two substantially perpendicular planes.

Any suitable structure, device or apparatus or any suitable combination of structures, devices or apparatus may be used to cause the first member to be rotatable about the swivel axis.

As a non-limiting example, in some embodiments, one of the first end of the first member and the first coupling shaft may define one or more arcuate flanges, the other of the first end of the first member and the first coupling shaft may define one or more arcuate grooves, and the one or more arcuate flanges may be received within the one or more arcuate grooves so that the first member is rotatable relative to the first coupling shaft about the swivel axis. In some particular embodiments, the first end of the first member may define the one or more arcuate flanges and the first coupling shaft may define the one or more arcuate grooves.

The first coupling shaft may comprise a single piece or component, or the first coupling shaft may comprise a plurality of pieces and/or components.

In some embodiments, the first coupling shaft may comprise a first pair of coupling shafts. The first pair of coupling shafts may be configured in any suitable manner. In some embodiments, the first pair of coupling shafts may be engaged with the second member on opposing sides of the second member so that the first end of the first member is interposed between the first pair of coupling shafts.

In some such embodiments, the first end of the first member may define one or more arcuate flanges, one of the first pair of coupling shafts may define one or more arcuate grooves, and/or the other of the first pair of coupling shafts may define one or more arcuate grooves.

In some particular embodiments, the first end of the first member may define a first arcuate flange and a second arcuate flange, one of the first pair of coupling shafts may define a first arcuate groove and the other of the first pair of coupling shafts may define a second arcuate groove. In such embodiments, the first arcuate flange may be received within the first arcuate groove and the second arcuate flange may be received within the second arcuate groove so that the first member is rotatable relative to the first pair of coupling shafts about the swivel axis.

Any suitable structure, device or apparatus or any suitable combination of structures, devices or apparatus may be used to cause the first coupling shaft to be rotatable relative to the second member about the first coupling shaft axis.

As a non-limiting example, in some embodiments, the first coupling shaft may be rotatably received within one or more bearing bores in the second member. The one or more bearing bores may provide one or more bearing surfaces for the first coupling shaft to enable the first coupling shaft to rotate relative to the second member. The one or more bearing surfaces may comprise any suitable type of bearing surface, including as non-limiting examples, a plain bearing surface, a bushing or a rolling element bearing surface.

In some particular embodiments, one of the first pair of coupling shafts may be rotatably received within a first bearing bore in the second member and the other of the first pair of coupling shafts may be rotatably received within a second bearing bore in the second member so that the first pair of coupling shafts is rotatable relative to the second member.

In some embodiments, the second member may have a sidewall. In such embodiments, one or more bearing bores may extend through the sidewall of the second member. In some particular embodiments, the first bearing bore and the second bearing bore may extend through the sidewall of the second member.

In some embodiments, the articulating assembly may comprise a first end retaining mechanism for retaining the first coupling shaft within the one or more bearing bores. In some particular embodiments, the first end retaining mechanism may retain the first pair of coupling shafts within the first bearing bore and the second bearing bore.

The first end retaining mechanism may comprise any suitable structure, device or apparatus or any suitable combination of structures, devices or apparatus which will inhibit or prevent the first coupling shaft from passing through the one or more bearing bores to the exterior of the articulating assembly. As non-limiting examples, in some embodiments, the first end retaining mechanism may comprise a first end retaining sleeve and/or one or more retaining plugs. In some particular embodiments, the first end retaining mechanism may comprise a first end retaining sleeve, a first retaining plug associated with the first bearing bore and a second retaining plug associated with the second bearing bore.

The first end retaining sleeve may be comprised of any suitable structure, device or apparatus or any suitable combination of structures, devices or apparatus. The first end retaining sleeve may partially or fully surround the second member and may partially or fully cover the one or more bearing bores. The first end retaining sleeve may be connected with the second member in any suitable manner, including as non-limiting examples, a threaded connection, an interference fit, snap rings, set screws, etc. In some embodiments, the first end retaining sleeve may comprise one or more seals for inhibiting or preventing debris from entering the one or more bearing bores from the exterior of the articulating assembly.

The one or more retaining plugs may be comprised of any suitable structure, device or apparatus or any suitable combination of structures, devices or apparatus, and may be associated with the one or more bearing bores in any suitable manner which will inhibit or prevent the first coupling shaft from passing through the bearing bores to the exterior of the articulating assembly. The one or more retaining plugs may partially or fully cover and/or fill the one or more bearing bores. The one or more retaining plugs may be connected with the second member in any suitable manner, including as non-limiting examples, a threaded connection, an interference fit, snap rings, set screws, etc. In some embodiments, the one or more retaining plugs may comprise one or more seals for inhibiting or preventing debris from entering the one or more bearing bores from the exterior of the articulating assembly.

In some embodiments, the articulating assembly may comprise a third member. The third member may comprise any suitable type of member.

The second end of the first member may comprise a fourth thrust bearing surface. The third member may comprise a third thrust bearing surface. In some embodiments, the fourth thrust bearing surface may be configured to engage with the third thrust bearing surface in order to transmit axial forces between the first member and the third member.

In some embodiments, one of the second end of the first member and the third member may comprise a pin or male component, and the other of the second end of the first member and the third member may comprise a socket or female component. In such embodiments, the second end of the first member may be received within the third member or the third member may be received within the second end of the first member. In some particular embodiments, the second end of the first member may be received within the third member.

In some embodiments, the articulating assembly may provide an articulating coupling between the first member and the third member.

In some embodiments, the articulating assembly may comprise a second coupling shaft which is engaged with the second end of the first member and with the third member. The second coupling shaft may comprise any suitable structure, device or apparatus or any suitable combination of structures, devices or apparatus.

The second coupling shaft may have a second coupling shaft axis. In some embodiments, the second coupling shaft may be rotatable relative to the third member about the second coupling shaft axis, the first member may be rotatable relative to the second coupling shaft about a swivel axis, and the swivel axis may be substantially perpendicular to the second coupling shaft axis. As a result, in such embodiments, the first member and the third member may be articulable relative to each other about two substantially perpendicular axes and/or in at least two substantially perpendicular planes.

Any suitable structure, device or apparatus or any suitable combination of structures, devices or apparatus may be used to cause the first member to be rotatable about the swivel axis.

As a non-limiting example, in some embodiments, one of the second end of the first member and the second coupling shaft may define one or more arcuate flanges, the other of the second end of the first member and the second coupling shaft may define one or more arcuate grooves, and the one or more arcuate flanges may be received within the one or more arcuate grooves so that the first member is rotatable relative to the second coupling shaft about the swivel axis. In some particular embodiments, the second end of the first member may define the one or more arcuate flanges and the second coupling shaft may define the one or more arcuate grooves.

The second coupling shaft may comprise a single piece or component, or the second coupling shaft may comprise a plurality of pieces and/or components.

In some embodiments, the second coupling shaft may comprise a second pair of coupling shafts. The second pair of coupling shafts may be configured in any suitable manner. In some embodiments, the second pair of coupling shafts may be engaged with the third member on opposing sides of the third member so that the second end of the first member is interposed between the second pair of coupling shafts.

In some such embodiments, the second end of the first member may define one or more arcuate flanges, one of the second pair of coupling shafts may define one or more arcuate grooves, and/or the other of the second pair of coupling shafts may define one or more arcuate grooves.

In some particular embodiments, the second end of the first member may define a first arcuate flange and a second arcuate flange, one of the second pair of coupling shafts may define a first arcuate groove and the other of the second pair of coupling shafts may define a second arcuate groove. In such embodiments, the first arcuate flange may be received within the first arcuate groove and the second arcuate flange may be received within the second arcuate groove so that the first member is rotatable relative to the second pair of coupling shafts about the swivel axis.

Any suitable structure, device or apparatus or any suitable combination of structures, devices or apparatus may be used to cause the second coupling shaft to be rotatable relative to the third member about the second coupling shaft axis.

As a non-limiting example, in some embodiments, the second coupling shaft may be rotatably received within one or more bearing bores in the third member. The one or more bearing bores may provide one or more bearing surfaces for the second coupling shaft to enable the second coupling shaft to rotate relative to the third member. The one or more bearing surfaces may comprise any suitable type of bearing surface, including as non-limiting examples, a plain bearing surface, a bushing or a rolling element bearing surface.

In some particular embodiments, one of the second pair of coupling shafts may be rotatably received within a first bearing bore in the third member and the other of the second pair of coupling shafts may be rotatably received within a second bearing bore in the third member so that the second pair of coupling shafts is rotatable relative to the third member.

In some embodiments, the third member may have a sidewall. In such embodiments, one or more bearing bores may extend through the sidewall of the third member. In some particular embodiments, the first bearing bore and the second bearing bore may extend through the sidewall of the third member.

In some embodiments, the articulating assembly may comprise a second end retaining mechanism for retaining the second coupling shaft within the one or more bearing bores. In some particular embodiments, the second end retaining mechanism may retain the second pair of coupling shafts within the first bearing bore and the second bearing bore.

The second end retaining mechanism may comprise any suitable structure, device or apparatus or any suitable combination of structures, devices or apparatus which will inhibit or prevent the second coupling shaft from passing through the one or more bearing bores to the exterior of the articulating assembly. As non-limiting examples, in some embodiments, the second end retaining mechanism may comprise a second end retaining sleeve and/or one or more retaining plugs. In some particular embodiments, the second end retaining mechanism may comprise a second end retaining sleeve, a first retaining plug associated with the first bearing bore and a second retaining plug associated with the second bearing bore.

The second end retaining sleeve may be comprised of any suitable structure, device or apparatus or any suitable combination of structures, devices or apparatus. The second end retaining sleeve may partially or fully surround the third member and may partially or fully cover the one or more bearing bores. The second end retaining sleeve may be connected with the third member in any suitable manner, including as non-limiting examples, a threaded connection, an interference fit, snap rings, set screws, etc. In some embodiments, the second end retaining sleeve may comprise one or more seals for inhibiting or preventing debris from entering the one or more bearing bores from the exterior of the articulating assembly.

The one or more retaining plugs may be comprised of any suitable structure, device or apparatus or any suitable combination of structures, devices or apparatus, and may be associated with the one or more bearing bores in any suitable manner which will inhibit or prevent the second coupling shaft from passing through the bearing bores to the exterior of the articulating assembly. The one or more retaining plugs may partially or fully cover and/or fill the one or more bearing bores. The one or more retaining plugs may be connected with the third member in any suitable manner, including as non-limiting examples, a threaded connection, an interference fit, snap rings, set screws, etc. In some embodiments, the one or more retaining plugs may comprise one or more seals for inhibiting or preventing debris from entering the one or more bearing bores from the exterior of the articulating assembly.

The articulating assembly may comprise an articulating coupling at the first end of the first member, the second end of the first member, or at both the first end and the second end of the first member.

An articulating coupling at the first end of the first member may provide a coupling between the first member and a second member, and an articulating coupling at the second end of the first member may provide a coupling between the first member and a third member. In embodiments in which articulating couplings are provided at both ends of the first member, the articulating couplings may be similar to each other or may be different.

In some embodiments, the articulating assembly may be configured to provide a constant velocity joint.

FIGS. 1-9 depict non-limiting embodiments of an application of the articulating assembly in a drilling motor for use in drilling a borehole, wherein the articulating assembly is used to couple powertrain components of the drilling motor.

More particularly, FIG. 1 schematically depicts components of an exemplary drilling motor for use in drilling a borehole, including a power section, a transmission section including an articulating assembly, and a bearing section. FIGS. 2-9 depict features of the articulating assembly of FIG. 1, including a first articulating coupling and a second articulating coupling between members which are powertrain components of the drilling motor. The first articulating coupling depicted in FIGS. 2-5 may be provided at a first end of the transmission shaft in the drilling motor depicted in FIG. 1 and the second articulating coupling depicted in FIGS. 6-9 may be provided at a second end of the transmission shaft in the drilling motor depicted in FIG. 1 in order to provide the articulating assembly depicted in FIG. 1.

FIGS. 1-9 are exemplary only. The articulating assembly described herein may be used to couple two or more members in any suitable structure, device or apparatus, and may be used at any suitable location in any suitable structure, device or apparatus to couple two or more members.

Referring to FIG. 1, an exemplary drilling motor (20) comprises a plurality of sections, only some of which are depicted in FIG. 1. Depicted in FIG. 1 are a power section (22), a transmission section (24) and a bearing section (26). The sections of the drilling motor (20) constitute components of a powertrain which utilizes fluid energy to rotate a drill bit (not shown) connected with the drilling motor (20).

The sections of the drilling motor (20) are contained within a housing (30). The housing (30) may comprise a single piece tubular housing, or may comprise a plurality of housing sections connected together in a suitable manner.

As depicted in FIG. 1, the housing (30) comprises a plurality of housing sections connected together with threaded connections, including a power section housing (32), a transmission section housing (34), and a bearing section housing (36).

The power section (22) of the drilling motor (20) comprises a stator (40) and a rotor (42). The stator (40) is fixedly connected with the power section housing (32), and the rotor (42) is rotatable within the stator (40) in response to fluid circulating through the power section (22).

As depicted in FIG. 1, the power section (22) is a Moineau-type power section in which the stator (40) and the rotor (42) are lobed. The rotor (42) has one fewer lobe than the stator (40), and rotates within the stator (40) eccentrically relative to the axis of the drilling motor (20).

The transmission section (24) accommodates and converts the eccentric movement of the rotor (42) to concentric rotation of a driveshaft (44) within the bearing section housing (34). A drill bit (not shown) is connected directly or indirectly with the driveshaft (44) so that rotation of the rotor (42) causes rotation of the drill bit.

As depicted in FIG. 1, the transmission section (24) comprises a transmission shaft (50) which is coupled between the rotor (42) and the driveshaft (44) so that rotation of the rotor (42) causes rotation of the transmission shaft (50), and rotation of the transmission shaft (50) causes rotation of the driveshaft (44). The transmission shaft (50) may be directly or indirectly coupled with the rotor (42) and the driveshaft (44).

The transmission shaft (50) may comprise any structure, device or apparatus which is capable of accommodating the eccentric rotation of the rotor (42) and converting the eccentric rotation of the rotor (42) to concentric rotation of the driveshaft (44). As non-limiting examples, the transmission shaft (50) may comprise a relatively rigid shaft directly or indirectly coupled with the rotor (42) and the driveshaft with articulating couplings, or may comprise a flex shaft.

The articulating assembly described herein is particularly suited for use in a transmission section (24) of a drilling motor (20) as depicted in FIG. 1, in circumstances where the transmission shaft (50) comprises a relatively rigid shaft which is directly or indirectly coupled with the rotor (42) and the driveshaft (44) with articulating couplings located at opposite ends of the transmission shaft (50).

Exemplary embodiments of components of an exemplary articulating assembly (60) for use in an exemplary transmission section (24) of a drilling motor (20) as depicted in FIG. 1 are depicted in FIGS. 2-9.

Referring to FIG. 1, the transmission shaft (50) comprises a first member (70). The first member (70) has a first end (72) and a second end (74).

The first end (72) of the first member (70) is coupled with the rotor (42) via a second member (80). The second member (80) may be an adapter which is directly or indirectly connected with the rotor (42) in a suitable manner, or the second member (80) may be integrally formed with the rotor (42) so that the rotor (42) comprises the second member (80). A first articulating coupling (82) couples the first end (72) of the first member (70) with the second member (80).

The second end (74) of the first member (70) is coupled with the driveshaft (44) via a third member (90). The third member (90) may be an adapter which is directly or indirectly connected with the driveshaft (44) in a suitable manner, or the third member (90) may be integrally formed with the driveshaft (44) so that the driveshaft (44) comprises the third member (90). A second articulating coupling (92) couples the second end (74) of the first member (70) with the third member (90).

In the exemplary articulating assembly (60) depicted in FIG. 1, the first articulating coupling (82) and the second articulating coupling (92) are substantially identical. Features of the first articulating coupling (82) are depicted in FIGS. 2-5. Features of the second articulating coupling (92) are depicted in FIGS. 6-9.

Referring to FIGS. 2-5 with respect to the first articulating coupling (82), the first end (72) of the first member (70) comprises a first thrust bearing surface (100) and the second member (80) comprises a second thrust bearing surface (102). The first end (72) of the first member (70) is received within the second member (80) so that the first bearing surface (100) engages with the second thrust bearing surface (102), thereby enabling axial forces to be transmitted between the first member (70) and the second member (80).

A first coupling shaft (104) is engaged with the first end (72) of the first member (70) and with the second member (80). The first coupling shaft (104) has a first coupling shaft axis (106). The first coupling shaft (104) is rotatable relative to the second member (80) about the first coupling shaft axis (106). The first member (70) is rotatable relative to the first coupling shaft (104) about a swivel axis (108). The swivel axis (108) is substantially perpendicular to the first coupling shaft axis (104).

As depicted in FIGS. 2-5, the first coupling shaft (104) comprises a first pair of coupling shafts (104a, 104b). The first pair of coupling shafts (104a, 104b) is engaged with the second member (80) on opposing sides of the second member (80) so that the first end (72) of the first member (70) is interposed between the first pair of coupling shafts (104a, 104b).

As indicated above, the first member (70) is rotatable relative to the first coupling shaft (104) about the swivel axis (108). In the exemplary embodiments, rotation about the swivel axis (108) is enabled by an arrangement of arcuate flanges and arcuate grooves defined by the first end (72) of the first member (70) and by the first pair of coupling shafts (104a, 104b).

As depicted in FIGS. 2-5, one or more arcuate flanges are defined by the first end (72) of the first member (70) and one or more arcuate grooves are defined by the first pair of coupling shafts (104a, 104b). In other embodiments, one or more arcuate grooves may be defined by the first end (72) of the first member (70) and one or more arcuate flanges may be defined by the first pair of coupling shafts (104a, 104b).

More particularly, as depicted in FIGS. 2-5, the first end (72) of the first member (70) defines a first arcuate flange (120) and a second arcuate flange (122), one of the first pair of coupling shafts (104a, 104b) defines a first arcuate groove (124), and the other of the first pair of coupling shafts (104a, 104b) defines a second arcuate groove (126). The first arcuate flange (120) is received within the first arcuate groove (124) and the second arcuate flange (122) is received within the second arcuate groove (126) so that the first member (70) is rotatable relative to the first pair of coupling shafts (104a, 104b) about the swivel axis (108), but is restrained from rotation relative to the first pair of coupling shafts (104a, 104b) about other axes by the engagement of the surfaces of the arcuate flanges (120, 122) with the surfaces of the arcuate grooves (124, 126).

As depicted in FIGS. 2-5, the arcuate flanges (120, 122) are longer than the arcuate grooves (124, 126) to accommodate relative rotation between the first member (70) and the first pair of coupling shafts (104a, 104b).

As indicated above, the first coupling shaft (104) is rotatable relative to the second member (80) about the first coupling shaft axis (106). In the exemplary embodiments, rotation about the first coupling shaft axis (106) is enabled by rotatably receiving the first coupling shaft (104) within one or more bearing bores in the second member (80).

More particularly, as depicted in FIGS. 2-5, the second member (80) has a sidewall (130). One of the first pair of coupling shafts (104a, 104b) is rotatably received within a first bearing bore (132) in the sidewall (130) of the second member (80) and the other of the first pair of coupling shafts (104a, 104b) is rotatably received within a second bearing bore (134) in the sidewall (130) of the second member (80) so that the first pair of coupling shafts (104a, 104b) is rotatable relative to the second member (80) about the first coupling shaft axis (106), but is restrained from rotation relative to the second member (80) about other axes by the engagement of the first pair of coupling shafts (104a, 104b) with bearing surfaces provided within the bearing bores (132, 134).

In the exemplary embodiments, the bearing surfaces within the bearing bores (132, 134) are plain bearing surfaces. In other embodiments, the bearing surfaces within the bearing bores (132, 134) may comprise bushings, rolling element bearing surfaces, or any other suitable bearing surface.

As depicted in FIGS. 2-5, the bearing bores (132, 134) extend through the sidewall (130) of the second member (80) so that the first pair of coupling shafts (104a, 104b) is accessible from the exterior of the articulating assembly (20) without disassembling the entire articulating assembly (20). As a result, a first end retaining mechanism (140) is provided to retain the first pair of coupling shafts (104a, 104b) within the bearing bores (132, 134).

Figure 5:
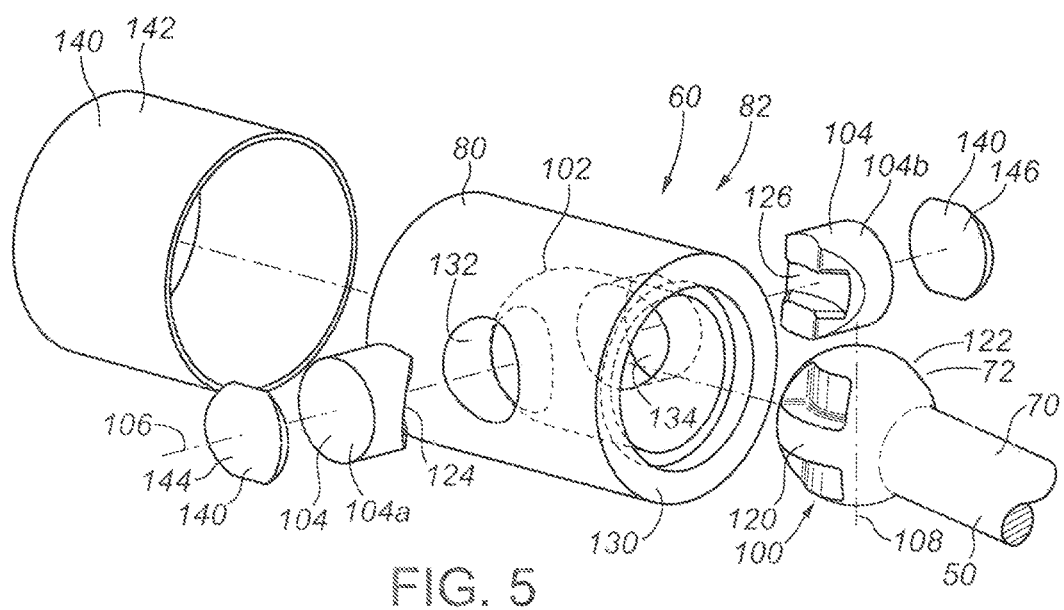
FIG. 5 is an exploded view of an embodiment of components of the articulating assembly depicted in FIG. 1, including a first articulating coupling.
Figure 6:
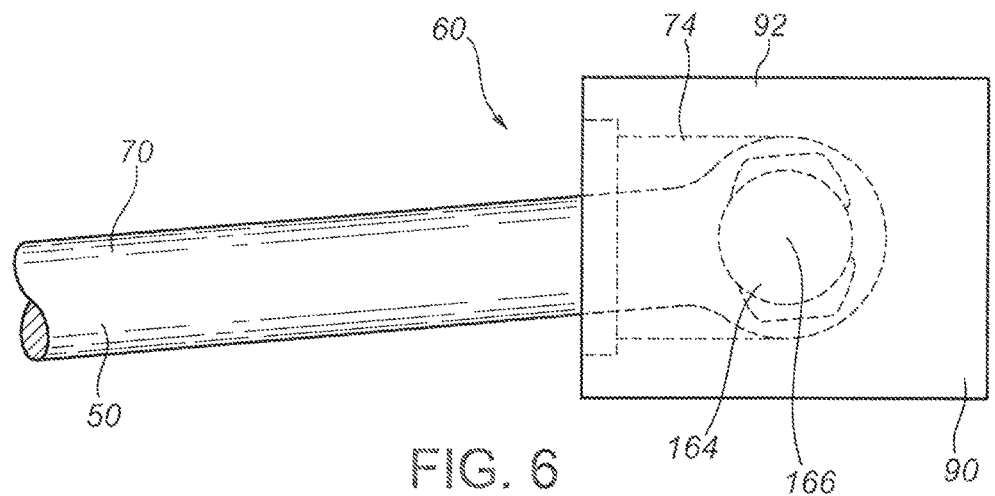
FIG. 6 is a side partial cutaway view of an embodiment of components of the articulating assembly depicted in FIG. 1, including a second articulating coupling.
Figure 7:
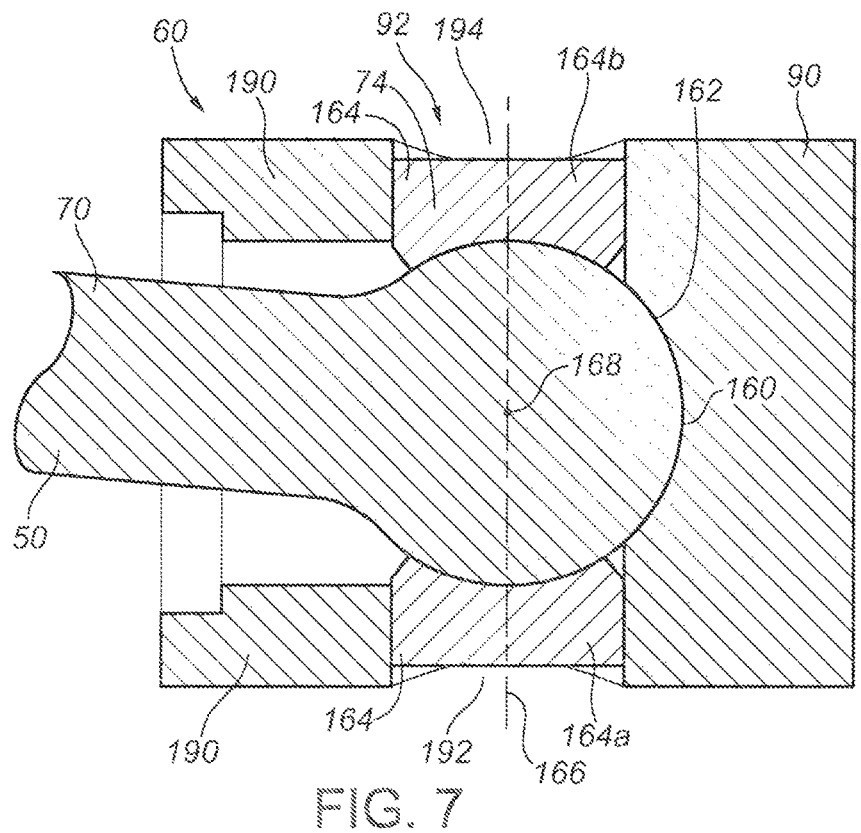
FIG. 7 is a plan partial section view of an embodiment of components of the articulating assembly depicted in FIG. 1, including a second articulating coupling.
Figure 8:
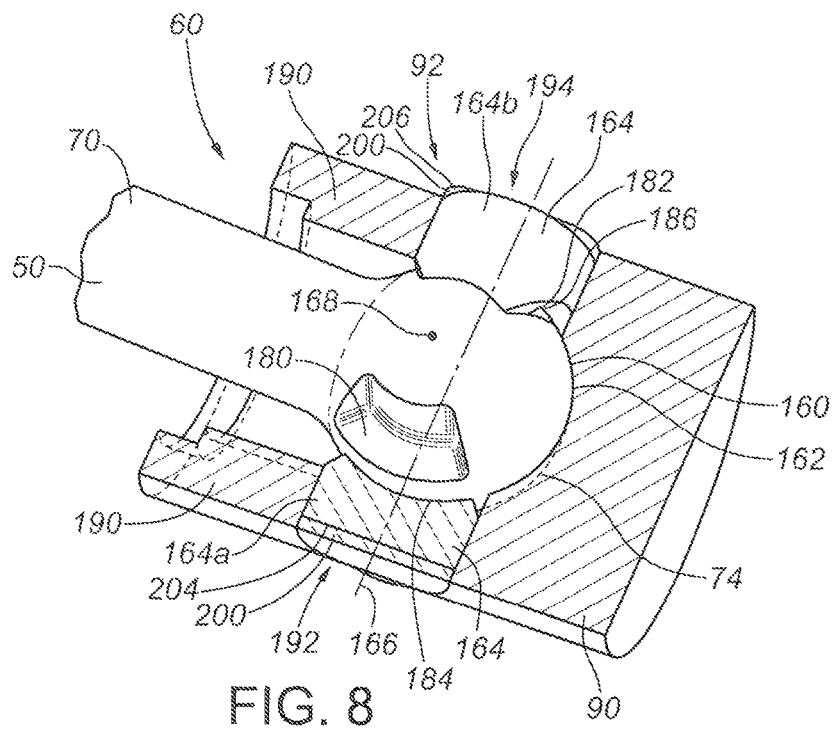
FIG. 8 is a pictorial partial cutaway view of an embodiment of components of the articulating assembly depicted in FIG. 1, including a second articulating coupling.

As depicted in FIG. 5, in the exemplary embodiments, the first end retaining mechanism (140) comprises a first end retaining sleeve (142) which fully surrounds the second member (80).

In the exemplary embodiments, the first end retaining sleeve (142) fully covers the bearing bores (132, 134) and may comprise one or more seals (not shown) to inhibit or prevent debris from entering the bearing bores (132, 134). The first end retaining sleeve (142) may be connected with the second member (80) in any suitable manner, including as non-limiting examples, a threaded connection, an interference fit, snap rings, set screws, etc.

As depicted in FIG. 5, in the exemplary embodiments, the first end retaining mechanism (140) also comprises a first retaining plug (144) associated with the first bearing bore (132) and a second retaining plug (146) associated with the second bearing bore (134).

In the exemplary embodiments, the retaining plugs (144, 146) fully cover and/or fill the bearing bores (132, 134) and may comprise one or more seals (not shown) to inhibit or prevent debris from entering the bearing bores (132, 134). In the exemplary embodiments, the retaining plugs (144, 146) may be connected with the second member (80) in any suitable manner, including as non-limiting examples with a threaded connection, an interference fit, snap rings, set screws, etc.

As indicated above, in the exemplary articulating assembly (60) depicted in FIG. 1, the first articulating coupling (82) and the second articulating coupling (92) are substantially identical.

Referring to FIGS. 6-9 with respect to the second articulating coupling (92), the second end (74) of the first member (70) comprises a fourth thrust bearing surface (160) and the third member (90) comprises a third thrust bearing surface (162). The second end (74) of the first member (70) is received within the third member (90) so that the fourth bearing surface (160) engages with the third thrust bearing surface (162), thereby enabling axial forces to be transmitted between the first member (70) and the third member (90).

A second coupling shaft (164) is engaged with the second end (74) of the first member (70) and with the third member (90). The second coupling shaft (164) has a second coupling shaft axis (166). The second coupling shaft (164) is rotatable relative to the third member (90) about the second coupling shaft axis (166). The first member (70) is rotatable relative to the second coupling shaft (164) about a swivel axis (168). The swivel axis (168) is substantially perpendicular to the second coupling shaft axis (164).

As depicted in FIGS. 6-9, the second coupling shaft (164) comprises a second pair of coupling shafts (164a, 164b). The second pair of coupling shafts (164a, 164b) is engaged with the third member (90) on opposing sides of the third member (90) so that the second end (74) of the first member (70) is interposed between the second pair of coupling shafts (164a, 164b).

As indicated above, the first member (70) is rotatable relative to the second coupling shaft (164) about the swivel axis (168). In the exemplary embodiments, rotation about the swivel axis (168) is enabled by an arrangement of arcuate flanges and arcuate grooves defined by the second end (74) of the first member (70) and by the second pair of coupling shafts (164a, 164b).

As depicted in FIGS. 6-9, one or more arcuate flanges are defined by the second end (74) of the first member (70) and one or more arcuate grooves are defined by the second pair of coupling shafts (164a, 164b). In other embodiments, one or more arcuate grooves may be defined by the second end (74) of the first member (70) and one or more arcuate flanges may be defined by the second pair of coupling shafts (164a, 164b).

More particularly, as depicted in FIGS. 6-9, the second end (74) of the first member (70) defines a first arcuate flange (180) and a second arcuate flange (182), one of the second pair of coupling shafts (164a, 164b) defines a first arcuate groove (184), and the other of the second pair of coupling shafts (164a, 164b) defines a second arcuate groove (186). The first arcuate flange (180) is received within the first arcuate groove (184) and the second arcuate flange (182) is received within the second arcuate groove (186) so that the first member (70) is rotatable relative to the second pair of coupling shafts (164a, 164b) about the swivel axis (168), but is restrained from rotation relative to the second pair of coupling shafts (164a, 164b) about other axes by the engagement of the surfaces of the arcuate flanges (180, 182) with the surfaces of the arcuate grooves (184, 186).

As depicted in FIGS. 6-9, the arcuate flanges (180, 182) are longer than the arcuate grooves (184, 186) to accommodate relative rotation between the first member (70) and the second pair of coupling shafts (164a, 164b).

As indicated above, the second coupling shaft (164) is rotatable relative to the third member (90) about the second coupling shaft axis (166). In the exemplary embodiments, rotation about the second coupling shaft axis (166) is enabled by rotatably receiving the second coupling shaft (164) within one or more bearing bores in the third member (90).

More particularly, as depicted in FIGS. 6-9, the third member (90) has a sidewall (190). One of the second pair of coupling shafts (164a, 164b) is rotatably received within a first bearing bore (192) in the sidewall (190) of the third member (90) and the other of the second pair of coupling shafts (164a, 164b) is rotatably received within a second bearing bore (194) in the sidewall (190) of the third member (90) so that the second pair of coupling shafts (164a, 164b) is rotatable relative to the third member (90) about the second coupling shaft axis (166), but is restrained from rotation relative to the third member (90) about other axes by the engagement of the second pair of coupling shafts (164a, 164b) with bearing surfaces provided within the bearing bores (192, 194).

In the exemplary embodiments, the bearing surfaces within the bearing bores (192, 194) are plain bearing surfaces. In other embodiments, the bearing surfaces within the bearing bores (192, 194) may comprise bushings, rolling element bearing surfaces, or any other suitable bearing surface.

As depicted in FIGS. 6-9, the bearing bores (192, 194) extend through the sidewall (190) of the third member (90) so that the second pair of coupling shafts (164a, 164b) is accessible from the exterior of the articulating assembly (20) without disassembling the entire articulating assembly (20). As a result, a second end retaining mechanism (200) is provided to retain the second pair of coupling shafts (164a, 164b) within the bearing bores (192, 194).

Figure 9:
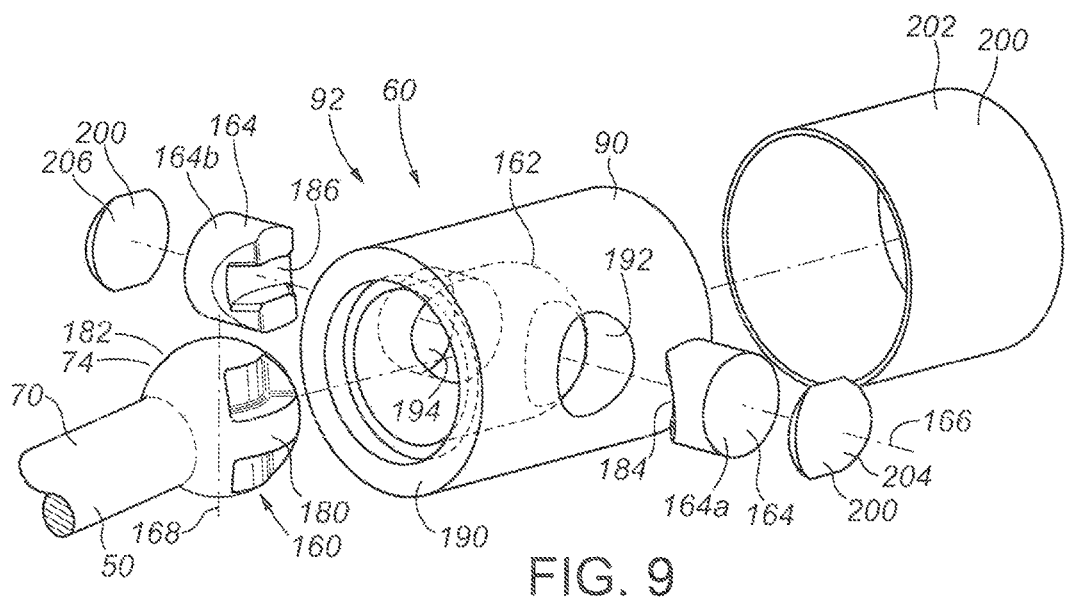
FIG. 9 is an exploded view of an embodiment of components of the articulating assembly depicted in FIG. 1, including a second articulating coupling.

As depicted in FIG. 9, in the exemplary embodiments, the second end retaining mechanism (200) comprises a second end retaining sleeve (202) which fully surrounds the third member (90).

In the exemplary embodiments, the second end retaining sleeve (202) fully covers the bearing bores (192, 194) and may comprise one or more seals (not shown) to inhibit or prevent debris from entering the bearing bores (192, 194). The second end retaining sleeve (202) may be connected with the third member (90) in any suitable manner, including as non-limiting examples, a threaded connection, an interference fit, snap rings, set screws, etc.

As depicted in FIG. 9, in the exemplary embodiments, the second end retaining mechanism (200) also comprises a first retaining plug (204) associated with the first bearing bore (192) and a second retaining plug (206) associated with the second bearing bore (194).

In the exemplary embodiments, the retaining plugs (204, 206) fully cover and/or fill the bearing bores (192, 194) and may comprise one or more seals (not shown) to inhibit or prevent debris from entering the bearing bores (192, 194). In the exemplary embodiments, the retaining plugs (204, 206) may be connected with the third member (90) in any suitable manner, including as non-limiting examples with a threaded connection, an interference fit, snap rings, set screws, etc.

The transmission section (24) of the drilling motor (20) comprising the articulating assembly (60) as depicted in FIGS. 1-9, including the first articulating coupling (82) and the second articulating coupling (92), may be assembled as follows:

1. the second member (80) may be connected with the rotor (42), or a rotor (42) having the features of the second member (80) may be provided;
2. the first end (72) of the first member (70) may be received within the second member (80) so that the first thrust bearing surface (100) engages with the second thrust bearing surface (102);
3. the first pair of coupling shafts (104*a*, 104*b*) may be inserted within the bearing bores (132, 134) so that the arcuate flanges (120, 122) on the first end (72) of the first member (70) engage with the arcuate grooves (124, 126) on the first pair of coupling shafts (104*a*, 104*b*);
4. the retaining plugs (144, 146) may be inserted within the bearing bores (132, 134) and connected with the second member (80);
5. the first end retaining sleeve (142) may be extended over the second member (80) and connected with the second member (80);
6. the third member (90) may be connected with the driveshaft (44), or a driveshaft (44) having the features of the third member (90) may be provided;
7. the second end (74) of the first member (70) may be received within the third member (90) so that the fourth thrust bearing surface (160) engages with the third thrust bearing surface (162);
8. the second pair of coupling shafts (164*a*, 164*b*) may be inserted within the bearing bores (192, 194) so that the arcuate flanges (180, 182) on the second end (74) of the first member (70) engage with the arcuate grooves (184, 186) on the second pair of coupling shafts (164*a*, 164*b*);
9. the retaining plugs (204, 206) may be inserted within the bearing bores (192, 194) and connected with the third member (90); and
10. the second end retaining sleeve (202) may be extended over the third member (90) and connected with the third member (90).

Assembly steps 6-10 may be performed before assembly steps 1-5 if the second articulating coupling (92) is assembled before the first articulating coupling (82). Disassembly of the articulating assembly (60) may be performed by reversing the assembly steps.

ADDITIONAL DISCLOSURES

The following are non-limiting, specific embodiments of the articulating assembly described herein:

Embodiment A

An articulating assembly comprising:
(a) a first member having a first end, wherein the first end of the first member comprises a first thrust bearing surface;
(b) a second member, wherein the second member comprises a second thrust bearing surface, and wherein the first end of the first member is received within the second member so that the first thrust bearing surface engages with the second thrust bearing surface; and
(c) a first coupling shaft engaged with the first end of the first member and with the second member, wherein the first coupling shaft has a first coupling shaft axis, wherein the first coupling shaft is rotatable relative to the second member about the first coupling shaft axis, wherein the first member is rotatable relative to the first coupling shaft about a swivel axis, and wherein the swivel axis is perpendicular to the first coupling shaft axis.

Embodiment B

The articulating assembly of Embodiment A wherein one of the first end of the first member and the first coupling shaft defines an arcuate flange, wherein the other of the first end of the first member and the first coupling shaft defines an arcuate groove, and wherein the arcuate flange is received within the arcuate groove so that the first member is rotatable relative to the first coupling shaft about the swivel axis.

Embodiment C

The articulating assembly of Embodiment B wherein the first end of the first member defines the arcuate flange and wherein the first coupling shaft defines the arcuate groove.

Embodiment D

The articulating assembly of any one of Embodiments A through C wherein the first coupling shaft comprises a first pair of coupling shafts and wherein the first pair of coupling shafts is engaged with the second member on opposing sides of the second member so that the first end of the first member is interposed between the first pair of coupling shafts.

Embodiment E

The articulating assembly of Embodiment D wherein the first end of the first member defines a first arcuate flange and a second arcuate flange, wherein one of the first pair of coupling shafts defines a first arcuate groove, wherein the other of the first pair of coupling shafts defines a second arcuate groove, wherein the first arcuate flange is received within the first arcuate groove, and wherein the second arcuate flange is received within the second arcuate groove so that the first member is rotatable relative to the first pair of coupling shafts about the swivel axis.

Embodiment F

The articulating assembly of any one of Embodiments D or E wherein one of the first pair of coupling shafts is rotatably received within a first bearing bore in the second member and wherein the other of the first pair of coupling shafts is rotatably received within a second bearing bore in the second member so that the first pair of coupling shafts is rotatable relative to the second member.

Embodiment G

The articulating assembly of Embodiment F wherein the second member has a sidewall and wherein the first bearing bore and the second bearing bore extend through the sidewall, further comprising a first end retaining mechanism for retaining the first pair of coupling shafts within the first bearing bore and the second bearing bore.

Embodiment H

The articulating assembly of Embodiment G wherein the first end retaining mechanism comprises a first end retaining sleeve surrounding the second member.

Embodiment I

The articulating assembly of any one of Embodiments G or H wherein the first end retaining mechanism comprises a first retaining plug associated with the first bearing bore and a second retaining plug associated with the second bearing bore.

Embodiment J

The articulating assembly of any one of Embodiments A through I wherein the first member has a second end and wherein the second end of the first member comprises a fourth thrust bearing surface, further comprising:
(a) a third member, wherein the third member comprises a third thrust bearing surface, and wherein the second end of the first member is received within the third member so that the fourth thrust bearing surface engages with the third thrust bearing surface; and
(b) a second coupling shaft engaged with the second end of the first member and with the third member, wherein the second coupling shaft has a second coupling shaft axis, wherein the second coupling shaft is rotatable relative to the third member about the second coupling shaft axis, wherein the first member is rotatable relative to the second coupling shaft about a swivel axis, and wherein the swivel axis is perpendicular to the second coupling shaft axis.

Embodiment K

The articulating assembly of Embodiment J wherein one of the second end of the first member and the second coupling shaft defines an arcuate flange, wherein the other of the second end of the first member and the second coupling shaft defines an arcuate groove, and wherein the arcuate flange is received within the arcuate groove so that the first member is rotatable relative to the second coupling shaft about the swivel axis.

Embodiment L

The articulating assembly of Embodiment K wherein the second end of the first member defines the arcuate flange and wherein the second coupling shaft defines the arcuate groove.

Embodiment M

The articulating assembly of any one of Embodiments J through L wherein the second coupling shaft comprises a second pair of coupling shafts and wherein the second pair of coupling shafts is engaged with the third member on opposing sides of the third member so that the second end of the first member is interposed between the second pair of coupling shafts.

Embodiment N

The articulating assembly of Embodiment M wherein the second end of the first member defines a first arcuate flange and a second arcuate flange, wherein one of the second pair of coupling shafts defines a first arcuate groove, wherein the other of the second pair of coupling shafts defines a second arcuate groove, wherein the first arcuate flange is received within the first arcuate groove, and wherein the second arcuate flange is received within the second arcuate groove so that the first member is rotatable relative to the second pair of coupling shafts about the swivel axis.

Embodiment O

The articulating assembly of any one of Embodiments M or N wherein one of the second pair of coupling shafts is rotatably received within a first bearing bore in the third member and wherein the other of the second pair of coupling shafts is rotatably received within a second bearing bore in the third member so that the second pair of coupling shafts is rotatable relative to the third member about the second coupling shaft axis.

Embodiment P

The articulating assembly of Embodiment O wherein the third member has a sidewall and wherein the first bearing bore and the second bearing bore extend through the sidewall, further comprising a second end retaining mechanism for retaining the second pair of coupling shafts within the first bearing bore and the second bearing bore.

Embodiment Q

The articulating assembly of Embodiment P wherein the second end retaining mechanism comprises a second end retaining sleeve surrounding the third member.

Embodiment R

The articulating assembly of any one of Embodiments P or Q wherein the second end retaining mechanism comprises a first retaining plug associated with the first bearing bore and a second retaining plug associated with the second bearing bore.

Embodiment S

The articulating assembly of any one of Embodiments A through I wherein the first member and the second member are components of a powertrain.

Embodiment T

The articulating assembly of any one of Embodiments A through I wherein the first member and the second member are components of an apparatus for use in a borehole.

Embodiment U

The articulating assembly of any one of Embodiments A through I wherein the first member and the second member are components of a drilling motor for use in drilling a borehole.

Embodiment V

The articulating assembly of any one of Embodiments J through R wherein the first member, the second member and the third member are components of a powertrain.

Embodiment W

The articulating assembly of any one of Embodiments J through S or Embodiment V wherein the first member, the second member and the third member are components of an apparatus for use in a borehole.

Embodiment X

The articulating assembly of any one of Embodiments J through R or any one of Embodiments V or W wherein the first member, the second member and the third member are components of a drilling motor for use in drilling a borehole.

In this document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The embodiments of the invention in which an exclusive property or privilege is claimed are defined as follows:

1. An articulating assembly comprising:
   (a) a first member having a first end, wherein the first end of the first member comprises a first thrust bearing surface;
   (b) a second member, wherein the second member comprises a second thrust bearing surface, and wherein the first end of the first member is received within the second member so that the first thrust bearing surface engages with the second thrust bearing surface; and
   (c) a first coupling shaft engaged with the first end of the first member and with the second member, wherein the first coupling shaft has a first coupling shaft axis, wherein the first coupling shaft is rotatable relative to the second member about the first coupling shaft axis, wherein the first member is rotatable relative to the first coupling shaft about a swivel axis, and wherein the swivel axis is perpendicular to the first coupling shaft axis.

2. The articulating assembly as claimed in claim 1 wherein one of the first end of the first member and the first coupling shaft defines one or more arcuate flanges, wherein the other of the first end of the first member and the first coupling shaft defines one or more arcuate grooves, and wherein the one or more arcuate flanges are received within the one or more arcuate grooves so that the first member is rotatable relative to the first coupling shaft about the swivel axis.

3. The articulating assembly as claimed in claim 2 wherein the first end of the first member defines the one or more arcuate flanges and wherein the first coupling shaft defines the one or more arcuate grooves.

4. The articulating assembly as claimed in claim 1 wherein the first coupling shaft comprises a first pair of coupling shafts and wherein the first pair of coupling shafts is engaged with the second member on opposing sides of the second member so that the first end of the first member is interposed between the first pair of coupling shafts.

5. The articulating assembly as claimed in claim 4 wherein one of the first end of the first member and the first coupling shaft defines one or more arcuate flanges, wherein the other of the first end of the first member and the first coupling shaft defines one or more arcuate grooves, and wherein the one or more arcuate flanges are received within the one or more arcuate grooves so that the first member is rotatable relative to the first pair of coupling shafts about the swivel axis.

6. The articulating assembly as claimed in claim 5 wherein the first end of the first member defines the one or more arcuate flanges and wherein the first coupling shaft defines the one or more arcuate grooves.

7. The articulating assembly as claimed in claim 4 wherein the first end of the first member defines a first arcuate flange and a second arcuate flange, wherein one of the first pair of coupling shafts defines a first arcuate groove, wherein the other of the first pair of coupling shafts defines a second arcuate groove, wherein the first arcuate flange is received within the first arcuate groove, and wherein the second arcuate flange is received within the second arcuate groove so that the first member is rotatable relative to the first pair of coupling shafts about the swivel axis.

8. The articulating assembly as claimed in claim 4 wherein one of the first pair of coupling shafts is rotatably received within a first bearing bore in the second member and wherein the other of the first pair of coupling shafts is rotatably received within a second bearing bore in the second member so that the first pair of coupling shafts is rotatable relative to the second member about the first coupling shaft axis.

9. The articulating assembly as claimed in claim 8 wherein the second member has a sidewall and wherein the first bearing bore and the second bearing bore extend through the sidewall, further comprising a first end retaining mechanism for retaining the first pair of coupling shafts within the first bearing bore and the second bearing bore.

10. The articulating assembly as claimed in claim 9 wherein the first end retaining mechanism comprises a first end retaining sleeve surrounding the second member.

11. The articulating assembly as claimed in claim 9 wherein the first end retaining mechanism comprises a first retaining plug associated with the first bearing bore and a second retaining plug associated with the second bearing bore.

12. The articulating assembly as claimed in claim 11 wherein the first end retaining mechanism comprises a first end retaining sleeve surrounding the second member.

13. The articulating assembly as claimed in claim 1 wherein the first member has a second end and wherein the second end of the first member comprises a fourth thrust bearing surface, further comprising:
   (a) a third member, wherein the third member comprises a third thrust bearing surface, and wherein the second end of the first member is received within the third member so that the fourth thrust bearing surface engages with the third thrust bearing surface; and
   (b) a second coupling shaft engaged with the second end of the first member and with the third member, wherein the second coupling shaft has a second coupling shaft axis, wherein the second coupling shaft is rotatable relative to the third member about the second coupling shaft axis, wherein the first member is rotatable relative to the second coupling shaft about a swivel axis, and wherein the swivel axis is perpendicular to the second coupling shaft axis.

14. The articulating assembly as claimed in claim 13 wherein the second coupling shaft comprises a second pair of coupling shafts and wherein the second pair of coupling shafts is engaged with the third member on opposing sides of the third member so that the second end of the first member is interposed between the second pair of coupling shafts.

15. The articulating assembly as claimed in claim 14 wherein the second end of the first member defines a first arcuate flange and a second arcuate flange, wherein one of the second pair of coupling shafts defines a first arcuate groove, wherein the other of the second pair of coupling shafts defines a second arcuate groove, wherein the first arcuate flange is received within the first arcuate groove, and wherein the second arcuate flange is received within the second arcuate groove so that the first member is rotatable relative to the second pair of coupling shafts about the swivel axis.

16. The articulating assembly as claimed in claim 14 wherein the first member, the second member and the third member are components of a drilling motor for use in drilling a borehole.

17. The articulating assembly as claimed in claim 15 wherein one of the second pair of coupling shafts is rotatably received within a first bearing bore in the third member and wherein the other of the second pair of coupling shafts is rotatably received within a second bearing bore in the third member so that the second pair of coupling shafts is rotatable relative to the third member about the second coupling shaft axis.

18. The articulating assembly as claimed in claim 17 wherein the third member has a sidewall and wherein the first bearing bore and the second bearing bore extend through the sidewall, further comprising a second end retaining mechanism for retaining the second pair of coupling shafts within the first bearing bore and the second bearing bore.

19. The articulating assembly as claimed in claim 13 wherein the first member, the second member and the third member are components of a powertrain.

20. The articulating assembly as claimed in claim 13 wherein the first member, the second member and the third member are components of an apparatus for use in a borehole.

* * * * *